United States Patent [19]

Cooper

[11] Patent Number: 4,751,467
[45] Date of Patent: Jun. 14, 1988

[54] SYSTEM FOR DETERMINING LIQUID FLOW RATE THROUGH LEAKS IN IMPERMEABLE MEMBRANE LINERS

[75] Inventor: John W. Cooper, San Antonio, Tex.

[73] Assignee: Southwest Research Institute, San Antonio, Tex.

[21] Appl. No.: 27,736

[22] Filed: Mar. 19, 1987

[51] Int. Cl.$^4$ .............................................. G01R 31/00
[52] U.S. Cl. ..................................... 324/557; 324/554; 340/606; 340/605
[58] Field of Search ............... 324/551, 554, 555, 557; 340/604–606; 73/861.08

[56] References Cited

U.S. PATENT DOCUMENTS

| | | | |
|---|---|---|---|
| 3,526,831 | 9/1970 | Smith | 324/54 |
| 3,800,217 | 3/1974 | Lowrance | 324/54 |
| 4,101,827 | 7/1978 | Offner | 324/65 |
| 4,543,525 | 9/1985 | Boryta et al. | 324/54 |

Primary Examiner—Reinhard J. Eisenzopf
Assistant Examiner—Jack B. Harvey
Attorney, Agent, or Firm—Gunn, Lee & Jackson

[57] ABSTRACT

A method and apparatus for determining the rate of flow of a leak through a geomembrane is set forth. In the preferred and illustrated embodiment, a surrounding lower skirt having a peripheral weight thereabout is placed on the bottom to surround the location of the leak. The skirt supports a cover. A portion of the skirt or cover is made of an ionic and electrically permeable membrane to permit current flow. A second liquid is defined to be miscible with the first liquid and to have a markedly different electrical conductivity. The rate of flow of the second liquid out of the lower skirt and cover is determined by measuring the electrical potential between liquid in the impoundment and the second liquid within the skirt as the electrical conductivity of the surrounding earth is altered by invasion of the second liquid into the soil under the geomembrane liner. The apparatus utilizes a reservoir of the second liquid which is delivered through a suitable valve and fill hose into the lower skirt and cover.

11 Claims, 1 Drawing Sheet

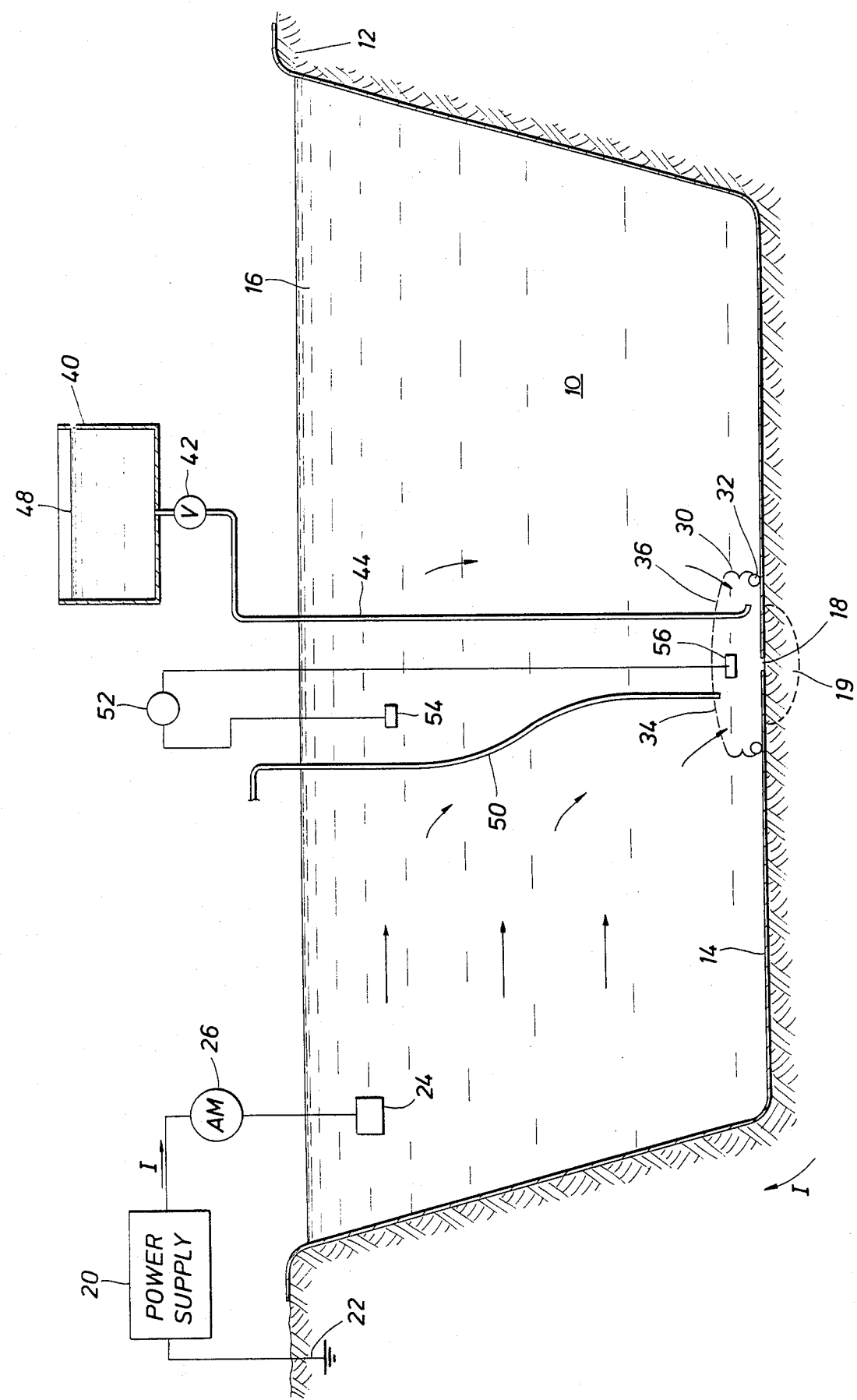

SYSTEM FOR DETERMINING LIQUID FLOW RATE THROUGH LEAKS IN IMPERMEABLE MEMBRANE LINERS

FIELD OF THE INVENTION

This invention is direction to a method and apparatus for detecting leak flow rate through a geomembrane forming a liquid impoundment. In the event of such a leak, the rate of flow through the leak is determined. The apparatus incorporates an enclosed cap having a lower skirt having a nether edge adapted to surround a leak and a cover over the region of the leak. The cover includes a portion which is permeable to ionic and electric current flow from the liquid in the impoundment into the region of the leak. The volume enclosed by the lower skirt and cover is filled with a fluid having a markedly different electrical conductivity than that of the impounded liquid. Potential electrodes are mounted within the enclosed volume and in the impoundment. The rate at which the electrical potential between the electrodes change is related to the rate of flow through the leak.

BACKGROUND OF THE INVENTION

This disclosure is directed to a method of determining leakage flow rate from a perforation or tear in a geomembrane. A geomembrane is defined as a sheet typically made of pliable plastic material. It is normally used to form a shallow pond in an embankment or other impoundment to store liquids. On the one hand, it may be a pond for storing potable water. On the other hand, it can be used to store toxic waste, or the like. In general terms, the impoundment is a shallow pond with a surrounding wall or bank. The pond is lined with the geomembrane, typically applied in single or multiple layers. The geomembrane is formed of several sheets which are joined at seams thereby defining the impoundment. The plastic sheet material thus forms an impermeable membrane. When a leak occurs, this can be disastrous to groundwater supplies, aquifers, and can otherwise create hazards for those who use such water supplies. The rate of leakage may vary widely. For instance, if the impermeable geomembrane is placed over a relatively impervious layer of clay, the leakage rate may be substantially zero. On the other hand, the soil beneath the geomembrane may be highly permeable and the leakage rate can be quite high. It is important to know the rate of leakage once a leak has been located. This is important so that the nature and extent of repair activity for the leak can then be determined. For instance, if there is a tear, but the leakage rate is negligible, the need for implementing repairs is not critical. However, if the leak rate is quite high, it is necessary to make a quick repair. Electrical leak detection methods alone cannot determine the amount of liquid leakage through a leak. If, over a long period of time, the liquid that has leaked through the hole has saturated the soil in a large area under the leak, or if the underside of the membrane is in contact with the ater table, or phreatic zone, the electrical measurement will only be affected by the accumulated liquids (electrolytes) not by the liquid leakage rate. The method in this disclosure, which incorporates an electrical detecton device in the apparatus will indicate the leakage rate.

SUMMARY OF THE INVENTION

The method and apparatus of this invention are directed to such a leak measuring system. It is particularly useful in measuring the rate of flow through a leak where overhead access to the leak can be obtained and for very small fluid leaks. Thus, after a leak has been determined to be formed in a geomembrane, the present apparatus is used to scale the size of a leak, namely, as a measured flow rate. This apparatus utilizes a surrounding peripheral lower skirt affixed beneath a flexible cover means. The cover means includes at least a portion thereof which is a permeable membrane that has very low permeability to liquids but high permeability to ion and electric current flow. The permeable portion enables the liquid of the impoundment to be in ionic contact with the liquid beneath the cover means. A particular liquid having a markedly different electrical conductivity is placed under the cover means. For instance, if the liquid in the reservoir impoundment is substantially nonconductive, a highly conductive liquid is used such as salt water. It is pumped from a supply through a fill line or hose extending through a valve into the space contained below the cover means and inside the skirt. In addition, a discharge hose is connected from this space. By pumping for an interval, the entire volume inside the lower skirt and beneath the cover means can be filled with a liquid having a very high electrical conductivity. After filling, a dipole measurement system measures the difference in electrical potential between the liquid in the impoundment and the liquid 'on the interior of the cover means and lower skirt. Over a period of time, liquid in the space under the cover means will leak through the hole in the membrane and into the space beneath the membrane. The conductivity of this space beneath will increase with a resulting increase in the electrical potential measured by the dipole system. Thus, the rate of change in the measured potential indicates the magnitude of the liquid leak. The flexible cover means equalizes the pressure across the membrane to prevent any liquid from flowing through the membrane. This flexible cover also allows the enclosed space to contract as the liquid leaks through the hole. In summary, the rate of flow acts on a dipole measuring system to provide an indication of leakage rate.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawing. It is to be noted, however, that the appended drawing illustrate only typical embodiments of this invention and are therefore not to be considered limiting of its scope, for the invention may admit to other equally effective embodiments. The single FIGURE discloses a system for fluid leak detection for leaks formed in an impermeable geomembrane wherein liquid in an impoundment enclosed by the geomembrane leaks through the geomembrane.

DESCRIPTION OF THE PREFERRED EMBODIMENT

Attention is directed to the only view of the drawing where the numeral 10 identifies a liquid impoundment.

It is formed by the use of earth moving equipment to define a shallow pond which has a surrounding dirt embankment 12. The dirt embankment typically defines a rectangular impoundment of any suitable size, ranging as high as several acres of surface area. The depth can be determined as a matter of scale. The impoundment is defined by a relatively thin sheet of plastic material known as a geomembrane. The geomembrane in the drawing is identified by the numeral 14. It is draped fully around or within the confines of the embankment. It defines a pond which can hold several million gallons of liquid 16. For purposes of discussion, assume that a leak 18 is formed in the geomembrane. It is desirable to measure the rate of flow through the leak 18. This rate of flow is dependent upon a number of factors, at least including the size of the tear in the geomembrane and the nature of the soil beneath the geomembrane.

The numeral 20 identifies a power supply. It has one electrode which is connected to a suitable ground 22. The ground is a return terminal for current flow. In addition, the other terminal of the power supply 20 is connected to an electric current injection electrode 24 within the liquid 16. This introduces a current flow into the liquid 16. This current flow is used to detect the leak. As will described in detail, the electrical potential is then measured by a dipole array with the electrodes 54 and 56 spaced at a constant distance from each other. When the dipole is brought into the vicinity of the electric leak 18, the observed dipole potential is increased until it reaches a peak as the dipole array passes over the leak. At that juncture, it is then important to measure the liquid flow rate through the leak 18. It will be understood that the leak 18 can be large or small, can vary widely, and can even be zero in the event that a quality layer of clay beneath the geomembrane blocks further flow. On the other hand, the geomembrane may be positioned on top of a permeable sand or the like which then permits a substantial flow out of the reservoir 10. This might be highly undesirable and to this end, the rate of flow of liquid through the leak 18 is measured by the procedure described hereinbelow.

Once the leak has been located, the present procedure contemplates the use of an enclosing cap having a weighted lower skirt 30 which typically has the form of a circle. The skirt 30 is positioned in the pond 10 and is lowered to encircle the leak 18. Conveniently, the skirt is equipped with a compliant lower lip 32 which also is preferably weighted so that the skirt will settle to the bottom and lay on the bottom. Normally, the bottom is relatively smooth. Undulations may occur in the geomembrane 14. They can be accommodated by making the skirt somewhat pliable so that it will position itself against the geomembrane 14. The skirt provides an upstanding surrounding plenum. Conveniently, weights are placed in the side wall of the skirt. A typical scale might be a skirt which is perhaps one to two meters in diameter and 'which stands about ½ meter tall. This defines an internal volume enclosed under the cap. This volume is closed over by a cover means 34. The cover means is a thin flexible impervious sheet which has a permeable portion at 36. If the skirt is about two meters in diameter, then the cover means encompasses an area of approximately two meters in diameter also. It is desirable that a portion, but not necessarily all, of the cover means 34 is a permeable membrane 36. The choice of material for the membrane is variant; as an example, one suitable material is sold under the trademark NAFION, a trademark of the DuPont Company, which describes an ion permeable membrane. The nature of the permeable membrane in part depends on the nature of the liquid which is in the liquid impoundment 10. Suffice it to say, those skilled in the art can select as suitable membrane member which permits ionic interchange and electrical current flow through the membrane while prohibiting liquid flow through the membrane.

The liquid 16 which fills the reservoir has a specific electrical conductivity. This conductivity is noted as a first data point. The precise measure is not essential. Rather, what is desirable as a generalization is whether or not the liquid is a quality conductor of electricity. Assume for purposes of discussion that it is a relatively good insulator and is not a good conductor of electricity. Once that has been defined, a second liquid is made available which has the opposite electrical conductivity. If the liquid in the impoundment is a significantly poor conductor, then the liquid to be used is a quality liquid conductor. In general terms, the second liquid is one which can dissolve into or be a solvent for the first liquid. In other words, this disclosure contemplates the used of a two liquid system, but the two liquids must have different electrical conductivities and yet still be miscible with one another. To this end, it would not be desirable to mix water with oil because of the miscibility problem. If, for instance, the impoundment enclosed oil of a specified electrical conductivity, then an organic solvent which has a markedly different electrical conductivity is preferably chosen, the particular solvent being the one which is an effective solvent to the other liquid.

The lower skirt is positioned around the leak 18. A reservoir 40 with the second liquid is made available. By means of a suitable valve 42 and pump (not shown for sake of clarity), a fill hose or line 44 is used to fill the volume within the lower skirt. The liquid in the reservoir 40 is identified by the numeral 48. This liquid is introduced into the lower skirt and displaces the liquid 16 which was there by virtue of the fact that the skirt is placed in the reservoir 16. In other words, the volume below the cover and within the skirt is then mostly displaced and the liquid 48 is placed therein. Liquid from the volume below the cover means is evacuated by a discharge hose 50. Transfer of the liquid can be accomplished in just a few minutes. It is desirable that the volume within the lower skirt be changed significantly in electrical conductivity in contrast with the liquid filling the reservoir. It may not be necessary in all cases to completely displace all of liquid 16 if a significant change in conductivity has been achieved before complete displacement by liquid 48. This is accomplished by the foregoing procedure.

A dipole measurement system including a meter 52 is then connected. It has one electrode terminal at 54 which is adjacent to the apparatus shown in this drawing. This terminal serves as a reference terminal and is fully contacted with the liquid 16 filling the impoundment. A second electrode terminal 56 is provided. It is placed within the lower skirt and beneath the cover means 34. The voltage potential between the two measurement points is then monitored. The sequence of operation will be made clear below.

The present procedure is practiced in the following manner. The possible leak is first located by electrical leak detection means. At this juncture, the operator will not known whether the electrical leak is also a liquid leak and is draining the impoundment fast or slow, or perhaps with no flow at all. The enclosing cap is positioned over this regions. When the cap is placed in the impoundment, it fills with the liquid 16 and there is no difference in electrical conductivity from the interior to the exterior of the skirt. The cap is then positioned to fully encircle the leak. The cap is sufficiently large to encompass the leak even if the precise location of the leak is not known. It has sufficient weight in the bottom edge of the skirt that leakage underneath the skirt is practically impossible. This isolates the leak so that only the leak can be tested. After the cap has been placed in position, the 'liquid 48 in the reservoir 40 is then delivered into the lower skirt and beneath the cover means. A complete exchange is undertaken, or substantially so. That is, the new liquid is introduced while the mixture of liquids in the skirt is removed through the outlet hose 50. Once this liquid is removed, then the observation of data can be undertaken. It will be understood that a totally pure liquid 48 from the reservoir is not essential; what is desirable is that a sufficient spread between the electrical conductivity of the liquid on the interior of the skirt be established relative to the liquid in the impoundment.

Dipole potential measurements are then made over a period of time. A timed series of measurements will establish whether there is a leak in which the liquid 48 is passing through the hole 18 or whether the hole 18 is just an electrical leak without liquid leakage. This timed series of measurements will also give an estimate of the magnitude of the fluid leak.

If there is a fluid leak, the electrolyte 48 will flow through the hole 18 and will establish an electrolyte filled zone 19 in the soil beneath the hole. The effective electrical resistance beyond the hole will decrease and the observed dipole electric potential will increase. If the soil beneath the hole has low liquid permeability, the electrolyte will not flow through the hole and there will only be a very slight decrease in the effective resistance and increase in the observed potential. The time rate of change in the increased observed potential gives an estimate of the magnitude of the fluid leak. A rapid increase in the observed potential indicates a large fluid leak.

The distance between the potential electrode outside the cap 54 and the electrode inside the cap 56 is large relative to the dimensions and volume of the cap so that the increased conductivity of the electrolyte 48 within the cap but above the hole will not have a noticeable effect on the observed dipole potential. The membrane in the cap permits the injection current to pass into the cap and into the hole with minimal resistance and without any surface contact potentials developed, as would be the case if a metal top were used. The flexible cover 34 equalizes the pressure across the membrane 36 to prevent liquid from flowing through the membrane 36 and allows the cap to contract while the liquid 48 is lost through the hole 18.

After the rate of flow through the leak is known, a particular repair sequence can then be determined. In part, the nature and urgency of the repair is dependent upon the rate of flow. Knowledge of the rate of flow is thus very important to the remedial procedures undertaken to repair and protect the geomembrane 14 and confine the impounded liquid. While the foregoing is directed to the preferred embodiment and a method of operation thereof, the scope is determined by the claims which follow.

I claim:

1. For use in measuring the rate of flow of a first liquid through a leak in a geomembrane lining a liquid impoundment, an apparatus comprising:

(a) a surrounding lower skirt having a nether border adapted to seal against said geomembrane and thereby surround said leak in said geomembrane;
    (b) a reservoir of a second liquid having a significant difference in electrical conductivity from said first liquid in said impoundment;
    (c) cover means extending over said skirt to close off said skirt to liquid flow;
    (d) means for delivering said second liquid into said skirt to fill said skirt and said cover means;
    (e) permeable means enabling a current flow path from said first liquid into said second liquid in said skirt and cover means, consisting partly of an ionic and electrical current permeable material that is impermeable to liquid flow;
    (f) means for measuring electrical potential between said first liquid and said second liquid in said skirt and cover means.

2. The apparatus of claim 1 wherein said surrounding lower skirt has a weighted lower edge and is an upstanding skirt forming a closed border to thereby define a specified volume beneath said cover means.

3. The apparatus of claim 2 wherein said reservoir is a separate container and is connected with said lower skirt and cover means by a fill hose controllably operated through a valve means.

4. The apparatus of claim 3 further including a discharge hose connecting from said lower skirt and cover means to remove said first liquid upon introduction of said second liquid from said reservoir.

5. The apparatus of claim 1 wherein said permeable means is a portion of said cover means and skirt and is permeable to ionic movement there across and is impermeable to liquid transfer there across.

6. The apparatus of claim 5 wherein said permeable membrane is in said cover means.

7. The apparatus of claim 1 wherein said measuring means includes meter means connected to a pair of electrodes, one electrode being adapted to be placed in said first liquid of the impoundment, and the other to be placed within said second liquid confined by said lower skirt and said cover means.

8. The apparatus of claim 1 further including a power supply having a grounded terminal and an injection electrode placed in said liquid impoundment.

9. The apparatus of claim 8 wherein said grounded terminal is external to the impoundment and geomembrane liner.

10. A method for measuring the rate of flow of liquid through a leak in a geomembrane lining, wherein said lining confines a liquid impoundment having a first liquid, the method comprising the steps of: placing a surrounding lower skirt having a transverse cover means thereover around and above a suspected leak in said geomembrane lining; creating an electric field gradient within said impoundment; and measuring the rate of flow of a second liquid from the volume defined by said lower skirt and cover means out through said leak, wherein said step of measuring liquid flow is achieved by measuring the rate of change in electrical potential between said liquid in said liquid impoundment and said second liquid placed within said lower skirt and cover means.

11. The method of claim 10 further including the step of providing a reservoir of said second liquid different from said first liquid in that said first and second liquids have markedly different electrical conductivity characteristics and are otherwise miscible, and including the step of filling said lower skirt and cover means with said second liquid, and thereafter measuring the rate of flow out of said skirt and cover means of said second liquid.

* * * * *